United States Patent
Muras et al.

(10) Patent No.: US 7,756,861 B2
(45) Date of Patent: *Jul. 13, 2010

(54) OPTIMIZING A COMPUTER DATABASE QUERY THAT FETCHES N ROWS

(75) Inventors: Brian Robert Muras, Rochester, MN (US); Robert Russell Nelson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 366 days.

This patent is subject to a terminal disclaimer.

(21) Appl. No.: 11/864,913

(22) Filed: Sep. 29, 2007

(65) Prior Publication Data

US 2008/0021869 A1 Jan. 24, 2008

Related U.S. Application Data

(63) Continuation of application No. 11/128,053, filed on May 12, 2005, now Pat. No. 7,343,367.

(51) Int. Cl.
*G06F 17/30* (2006.01)

(52) U.S. Cl. ............... 707/718; 707/E17.017

(58) Field of Classification Search ............ None
See application file for complete search history.

(56) References Cited

U.S. PATENT DOCUMENTS

| | | | | |
|---|---|---|---|---|
| 4,829,427 A | * | 5/1989 | Green | 707/4 |
| 5,598,559 A | * | 1/1997 | Chaudhuri | 707/2 |
| 5,864,840 A | * | 1/1999 | Leung et al. | 707/2 |
| 5,950,188 A | * | 9/1999 | Wildermuth | 707/3 |
| 6,032,143 A | * | 2/2000 | Leung et al. | 707/2 |
| 6,341,281 B1 | * | 1/2002 | MacNicol et al. | 707/3 |
| 6,598,041 B1 | | 7/2003 | Bernal et al. | |
| 6,606,626 B1 | * | 8/2003 | Ponnekanti | 707/8 |
| 6,643,637 B2 | | 11/2003 | Chen et al. | |
| 6,654,039 B1 | * | 11/2003 | Hollines et al. | 715/830 |
| 7,007,009 B2 | * | 2/2006 | Bestgen et al. | 707/3 |
| 7,567,952 B2 | * | 7/2009 | Muras et al. | 707/2 |
| 2003/0055813 A1 | * | 3/2003 | Chaudhuri et al. | 707/3 |
| 2003/0093408 A1 | * | 5/2003 | Brown et al. | 707/2 |
| 2003/0187858 A1 | * | 10/2003 | Kirk et al. | 707/100 |

(Continued)

FOREIGN PATENT DOCUMENTS

EP 965928 A2 * 12/1999

OTHER PUBLICATIONS

"Treating Data Transformations as Objects", Sep. 1992, IBM Technical Disclosure Bulletin, vol. 35, Issue 4A, pp. 200-205.*

*Primary Examiner*—Pierre M Vital
*Assistant Examiner*—Christopher P Nofal
(74) *Attorney, Agent, or Firm*—Martin & Associates, LLC; Bret J. Petersen

(57) ABSTRACT

An apparatus and method to optimize a query access plan in a computer database system. In preferred embodiments, the query optimizer determines the query can be optimized and generates for the query an optimized access plan that eliminates records defined by a Where clause and one or more ordering criteria prior to ordering the records (sorting or grouping) and then returning a first n rows.

13 Claims, 7 Drawing Sheets

U.S. PATENT DOCUMENTS

| | | | |
|---|---|---|---|
| 2005/0033730 A1* | 2/2005 | Chaudhuri et al. | 707/1 |
| 2006/0095440 A1* | 5/2006 | Dettinger et al. | 707/100 |
| 2006/0224563 A1* | 10/2006 | Hanson et al. | 707/2 |
| 2007/0038618 A1* | 2/2007 | Kosciusko et al. | 707/4 |
| 2007/0083490 A1 | 4/2007 | Au et al. | |
| 2007/0130115 A1 | 6/2007 | Au et al. | |
| 2008/0021868 A1* | 1/2008 | Muras et al. | 707/2 |
| 2008/0021869 A1 | 1/2008 | Muras et al. | |

* cited by examiner

| Predicate Expression | | | |
|---|---|---|---|
| Logical Expression | Relational Expression | Unary Expression | Boolean Expression |
| AND<br>OR<br>NOT<br>UNION | <<br>><br><=<br>>=<br><br>!= | isNull<br>isNotNull<br>exist<br>NotExist | TRUE<br>FALSE |

FIG. 2

Select * from Table1 where C1=4
AND (C2>6 OR C3!=8)

FIG. 3

C1=4 AND (C2>6 OR C3!=8)

SELECT * from TableT
where f1=0 or f2 = d
Order by f3 ⊃ 520
Fetch first 2 rows only ⊃ 510

600

TableT

| RRN | f1 | f2 | f3 |
|-----|----|----|----|
| 1 | 2 | c | 4 |
| 2 | 1 | b | 5 |
| 3 | 1 | c | 5 |
| 4 | 0 | a | 3 |
| 5 | 1 | a | 2 |
| 6 | 2 | a | 3 |
| 7 | 2 | d | 2 |
| 8 | 0 | d | 1 |
| 9 | 1 | d | 1 |
| 10 | 1 | d | 3 |

900

SELECT * from TableT
where (f1=0 AND f3<3) or (f2=d AND f3 <3)
Order by f3
Fetch first 2 rows only

SELECT * from TableT
where f3 < 4
Order by f1, f2
Fetch first 3 rows only

SELECT f3, count(*) from TableT
where f1 = 1 or f2 = d
Group by f3           1110
Fetch first 2 rows only

FIG. 11

OPTIMIZING A COMPUTER DATABASE QUERY THAT FETCHES N ROWS

CROSS-REFERENCE TO PARENT APPLICATION

This patent application is a continuation of a US patent entitled Optimizing a Database Query that Returns a Predetermined Number of Rows Using a Generated Optimized Access Plan, U.S. application Ser. No. 11/128,053, now U.S. Pat. No. 7,343,367 filed on May 12, 2005, which is incorporated herein by reference.

BACKGROUND OF THE INVENTION

1. Technical Field

This invention generally relates to computer systems, and more specifically relates to apparatus and methods for improving data access performance in a computer database which eliminate records prior to sorting or grouping in a query that fetches a first n rows.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A database query typically includes one or more predicate expressions interconnected with logical operators. A predicate expression is a general term given to an expression using one of the four kinds of operators (or their combinations): logical, relational, unary, and boolean, as shown in FIG. 2. A query usually specifies conditions that apply to one or more columns of the database, and may specify relatively complex logical operations on multiple columns. The database is searched for records that satisfy the query, and those records are returned as the query result.

Many internet web applications are being written that access databases and then present lists of data to a user in the form of a web page. The lists are usually ordered in a manner requested by the user and/or the web application. The data presented to the user in a single web page is often a partial list of a larger set of data. It may take several or many web pages to present the entire list of data. In this environment it is desirable to maintain data consistency across screen invocations, so that sequential data from a list can be presented to the user on subsequent web pages or screens.

One technique used to maintain data consistency across screen invocations is data ordering. To order the data, the database query is written to bring back the rows in a specific order, and then to limit the number of rows to be returned from the query with a Fetch First N Rows clause. Similarly, in an interactive query, only enough records needed to fill the screen need to be fetched. The query may produce a large number of results that have to be ordered and then a small subset of the results selected to be returned by the query. Moreover, in many cases the state of the database server is not maintained across screens or web pages. This means that each time the web application screen invokes the database, the invocation is an independent operation. Thus when each page of a list is retrieved, the server must repeat the query including the retrieval and ordering operations for many rows that are not needed on the current page.

As can be seen, the typical method for ordering the data is quite wasteful of system resources. This causes an undue burden on the computer system and increases access delay to database queries. Without a way to reduce database query time to improve system performance, the computer industry will continue to suffer from excessive delays in database accesses that require a subset of results in an ordered query.

DISCLOSURE OF INVENTION

In accordance with the preferred embodiments, an apparatus and method to optimize a query in a computer database by eliminating records prior to sorting or grouping and then returning a first n rows. In preferred embodiments, the query optimizer determines the query can be optimized and generates for the query an optimized access plan that eliminates records defined by a Where clause and one or more ordering criteria prior to ordering the records (sorting or grouping) and then returning a first n rows.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a table showing expressions that may be included in a predicate expression in a database query;

FIG. 3 is a sample database query in Structured Query Language (SQL);

FIG. 4 is a predicate expression that is representative of the Where clause in the sample database query of FIG. 2;

FIG. 9 is another sample Select query statement with a Return n Rows Only clause used to illustrate another embodiment;

FIG. 10 is another sample Select query statement with a Return n Rows Only clause used to illustrate another embodiment;

FIG. 11 is another sample Select query statement with a Return n Rows Only clause and a Group By clause used to illustrate another embodiment;

BEST MODE FOR CARRYING OUT THE INVENTION

1.0 Overview

Figure 1:
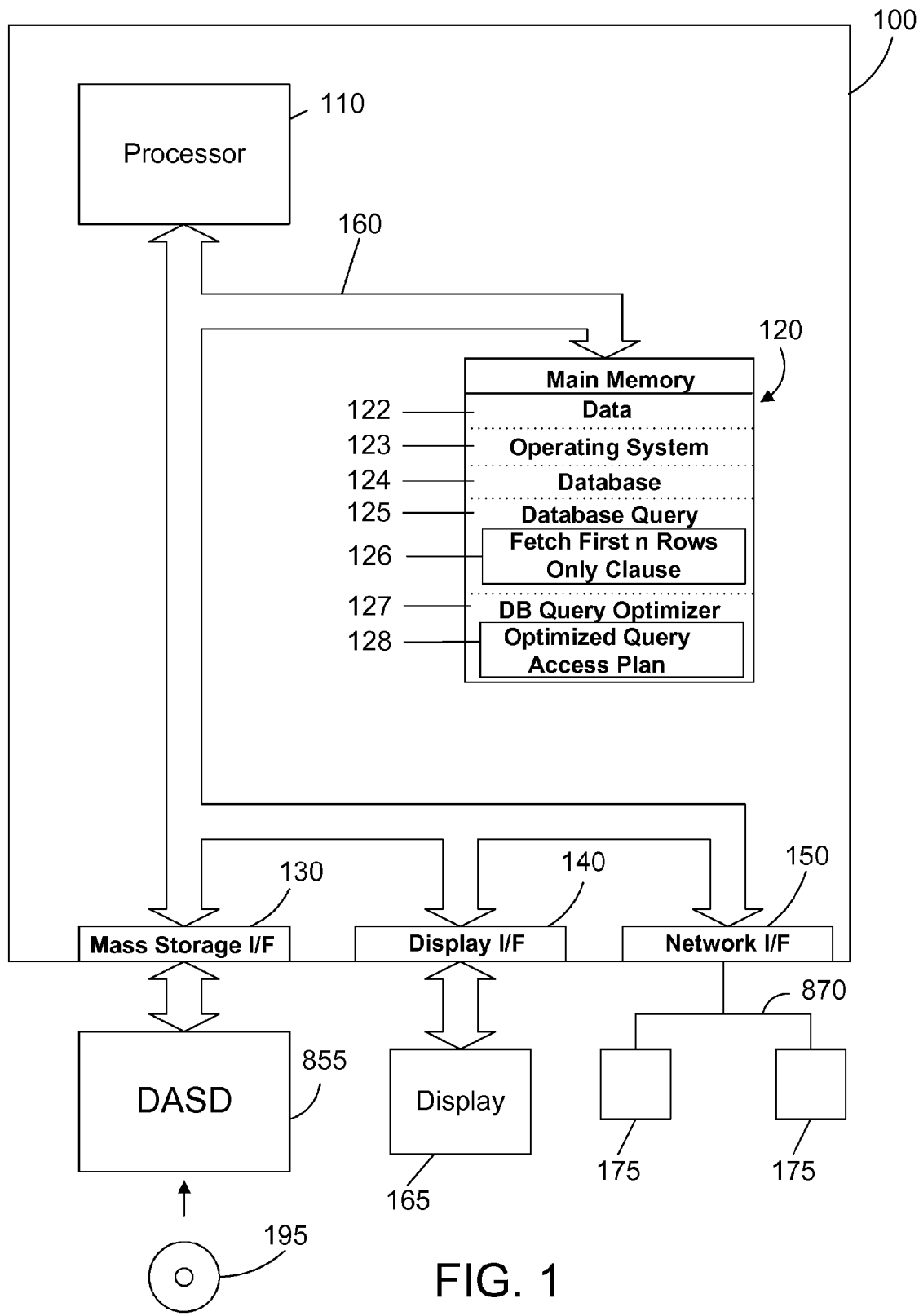
FIG. 1 is an apparatus in accordance with the preferred embodiments.

The present invention relates to optimizing database queries. For those not familiar with databases or queries, this Overview section provides background information that will help to understand the present invention.

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. A primary type of SQL query is the Select statement shown in FIG. 3. The Select statement specifies data to be retrieved from a database table. The Select statement tells the database query processor to Select all columns, the "from Table1" statement identifies which database table to search, and the Where clause specifies one or more expressions that must be satisfied for a record to be retrieved. Note that the query of FIG. 3 is expressed in terms of columns C1, C2 and C3. Information about the internal storage of the data is not required as long as the query is written in terms of expressions that relate to values in columns from tables.

For the query of FIG. 3, the Where clause specifies that the first column has a value equal to four (C1=4) logically ANDed with the expression that the second column is greater than six OR the third column is not equal to eight. The expression in the Where clause of FIG. 3 is shown in FIG. 4. Where not specifically stated herein, the term "expression" is intended to mean an arbitrary predicate expression, which can be an entire expression in a query, a portion of an expression in a query, or the entire query and may include logical expressions, relational expressions, unary expressions, boolean expressions, and their combinations.

In the prior art, a tool known as a query optimizer evaluates expressions in a query. When an expression becomes complex, the query optimizer often approaches the expression from multiple perspectives. The query optimizer generates one or more access plans to access the database, and then determines which access plan has the lowest cost or best performance. In many cases, the query optimizer will generate a new or reformulated query to improve performance. However, the prior art query optimizer is unable to optimize a Select statement with a Fetch First n Rows Only Clause to optimize system performance as described below with reference to the preferred embodiments.

2.0 Detailed Description

In accordance with the preferred embodiments, an apparatus and method is described to optimize a query access plan in a computer database system. In preferred embodiments, the query optimizer determines the query can be optimized and generates for the query an optimized access plan that eliminates records defined by a Where clause prior to a sort to order records and then return a first n rows.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 122, an operating system 123, a database 124, one or more database queries 125, a database query optimizer 127, and an optimized query access plan 128. One or more of the database queries 125 may include one or more Select statements with Fetch First n Rows Only Clause 126. Note that Select statements with Fetch First n Rows Only Clause 126, the database query optimizer 127, and the optimized query access plan 128 are described in further detail below.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Database 124 is any suitable database, whether currently known or developed in the future. Database query 125 is a query in a format compatible with the database 124 that allows information stored in the database 124 that satisfies the database query 125 to be retrieved. Database query optimizer 127 processes one or more expressions in database query 125, including a Select query statement with a Fetch First n Rows Only Clause 126 in accordance with the preferred embodiments. Query optimizer 127 optimizes a query 125 that includes a Fetch First n Rows Only Clause 126 to generate a corresponding optimized query access plan 128.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, database 124, database query 125, and the database query optimizer 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the description above is in the context of a fully functional computer system, those skilled in the art will appreciate that the query optimizer may be distributed as an article of manufacture in a variety of forms, and the claims extend to all suitable types of computer-readable media used to actually carry out the distribution, including recordable media such as floppy disks and CD-RW (e.g., 195 of FIG. 1).

Figures 5, 6, 7, 8:
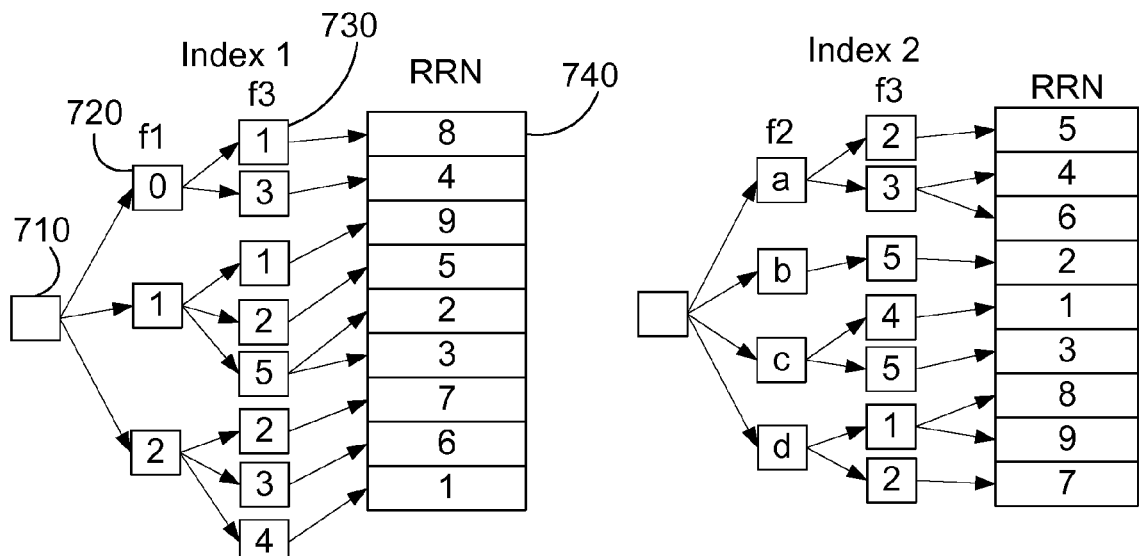
FIG. 5 is a sample Select query statement with a Fetch First n Rows Only clause and an Order By clause used to illustrate a first embodiment.
FIG. 6 is a sample database table accessed by the query of FIG. 5.
FIG. 7 is a sample index over columns f1 and f3 of the Table shown in FIG. 6.
FIG. 8 is a sample index over columns f2 and f3 of the Table shown in FIG. 6.

Referring now to FIG. 5, a query 500 is shown for an example of how a query may be analyzed and executed in accordance with preferred embodiments. Query 500 is an illustrative example of a query 125 (FIG. 1) that resides in main memory 120 (FIG. 1). Query 500 has a Select with an OR'd predicate for the Where clause. The Where clause is as follows: (where f1=0 or f2=d). The order by clause instructs the query to order by field "f3." Since the query includes a Fetch First n Rows Only clause 510 and an Order By clause 520 (or a Group by clause) the query optimizer recognizes that the query is potentially a candidate for optimization according to the preferred embodiments described below.

FIG. 6 shows a sample database table 600 for the example query shown in FIG. 5. Each of the rows in the table has data as shown for illustration of the first embodiment. The table 600 is called 'TableT' and has the following columns: "RRN", "f1", "f2" and "f3". The RRN column is the relative record number and the other three columns are fields of the database that hold data.

FIGS. 7 and 8 show two indexes that are available for TableT, Index 1 shown in FIG. 7 and Index 2 shown in FIG. 8. Index 1 is over fields f1 and f3 and Index 2 is over fields f2 and f3. Referring to FIG. 7, Index 1 is illustrated in a tree format with the root 710 pointing to all the unique values for the field f1 720. Each unique value of field f1 720 then points to all the unique values of f3 730 that are in the database. The last column in the index has the RRN for the data record corresponding to the data for the respective tree branch. For example, the first row 740 has the value 8, which means that RRN 8 is the first record for f1=0 and f3=1. Similarly Index 2 shown in FIG. 8 shows the RRN's of the table sorted in the order of field f2 and then field f3.

When the query shown in FIG. 5 is executed for TableT 600 shown in FIG. 6 according to the prior art, all the records where f1=0 and f2=d would be returned as follows:

| RRN | f1 | f2 | f3 |
|-----|----|----|----|
| 4   | 0  | a  | 3  |
| 8   | 0  | d  | 1  |
| 7   | 2  | d  | 2  |
| 8   | 0  | d  | 1  |
| 9   | 1  | d  | 1  |
| 10  | 1  | d  | 3  |

These records would then be sorted by f3 and DISTINCT applied to RRN as follows:

| RRN | f1 | f2 | f3 |
|-----|----|----|----|
| 8   | 0  | d  | 1  |
| 9   | 1  | d  | 1  |
| 7   | 2  | d  | 2  |
| 4   | 0  | a  | 3  |
| 10  | 1  | d  | 3  |

The query would then return the first two rows. While the number of records sorted in this example is small (6), in a real data system, this number is often much larger, and the resources to perform sort is significant.

In contrast, according to a preferred embodiment, the query shown in FIG. 5 would be executed as follows. The query optimizer would identify the availability of sorting field f3 in each of the indexes of the Select query predicate, i.e. index1 (f2, f3) and index2 (f1, f3). Since f3 is in each of the indexes, the query needs only to return 2 rows for each index prior to the sort to insure that the needed records are available for the query. The remaining records (where f=0 and f2=d) do not need to be included in the sort. After sorting this reduced set of records, the first two rows can be returned to complete the query. In the Example shown in FIGS. 5 and 6, the access plan of the query would be modified such that the first predicate "where f1=0" would be executed to obtain the first two data records using index1. The first 2 results from index1 (where f1=0) is RRN 8 and 4 as follows:

| RRN | f1 | f2 | f3 |
|---|---|---|---|
| 8 | 0 | d | 1 |
| 4 | 0 | a | 3 |

Similarly, the access plan of the query would be modified such that the second "OR'd" predicate "where f2=d" would be executed to obtain the first two data records using index2. The first 2 results from index2 (where f2=d) is RRN 8 and 9 as follows:

| RRN | f1 | f2 | f3 |
|---|---|---|---|
| 8 | 0 | d | 1 |
| 9 | 1 | d | 1 |

The results from both indexes are then merged together while applying DISTINCT to RRN (combining common records) and sorted by f3 to give the following:

| RRN | f1 | f2 | f3 |
|---|---|---|---|
| 8 | 0 | d | 1 |
| 9 | 1 | d | 1 |
| 4 | 0 | a | 3 |

Note that the sort was done on a small subset of the records. Only the first two rows are returned as shown below without the RRN:

| f1 | f2 | f3 |
|---|---|---|
| 0 | d | 1 |
| 1 | d | 1 |

Again referring to FIG. 6 and Table 600 and with reference to FIG. 9 and query 900, another example of how a query may be analyzed and executed in accordance with another preferred embodiment is shown. If the query 500 is given, but the indexes as described in the previous example are not available, another potential optimization may be available according to this embodiment. Similar to the previous example, the query optimizer recognizes the query is potentially a candidate for optimization since it includes a Fetch First n Rows Only clause and an Order By clause. In this embodiment, the query optimizer determines whether it is able to make a reasonable guess as to the value of field3 to insure a sufficiently large enough subset of the data is returned, i.e. a low water mark. If such a low water mark is available or can be determined, another predicate can be added to the Where clause to exclude rows outside the first n rows prior to the sort. Where these rows are not needed and can be eliminated prior to the sort the query can thus be optimized for increased performance.

In the illustrated example, if it can be determined that all the values of f3 are less than 3 in the subset of data which includes n rows, then query 500 can be reformulated to query 900 as shown in FIG. 9. This modified query could potentially require a sort of a small subset of records compared to the original query, giving a significant boost in system performance. The query can be reformulated and sent to the database manager, or the cost for this query or access plan can be compared to other potential access plans.

When the query shown in FIG. 9 is executed for TableT 600 shown in FIG. 6 according to the prior art, all the records where f1=0 and f2=d would be returned the same as the prior art example shown above. In contrast, according to a preferred embodiment, the query shown in FIG. 9 would be executed as follows:

| RRN | f1 | f2 | f3 |
|---|---|---|---|
| 8 | 0 | d | 1 |
| 7 | 2 | d | 2 |
| 8 | 0 | d | 1 |
| 9 | 1 | d | 1 |

These records would then be sorted by f3 and DISTINCT applied to RRN as follows:

| RRN | f1 | f2 | f3 |
|---|---|---|---|
| 8 | 0 | d | 1 |
| 9 | 1 | d | 1 |
| 7 | 2 | d | 2 |

The query would then return the first two rows.

The previous embodiment has some limitations on when it would be effective. This method would have to be limited to special cases such as a single file query or left most file in a left outer join, otherwise one could get wrong records with an inner join—because the top 3 records in one file may be eliminated by the join criteria (i.e. not finding a match in secondary table). Referring now to FIG. 10, a query 1000 is shown for another example of how a query may be analyzed and executed in accordance with preferred embodiments. This embodiment uses a partial sort to limit the number of records that must be sorted later. When confronted with a query such as shown FIG. 10, the prior art query optimizer attempted to find a single index which entirely satisfied the ordering to use for sorting. If no index was found, the optimizer decided it must perform the sort (i.e. output to a temporary file and sort the whole thing). In contrast, in the present embodiment, a partial sort using an index which partially covers the order by criteria is used to limit the number of rows which must be sorted. For example, given some query which ORDERs BY more than one column, if there is an index over the leftmost column(s), but not over all the columns, then if we use the index to control the sorting of the columns it is over (i.e. by locking the file in the first join position and accessing rows in the indexed order), then we process until we have matched the first N rows but additionally we must continue fetching rows until a new unique value is selected from the index. Then we stop fetching, and now all that is left is to sort the records fetched thus far which is likely a number much closer to N (which is much smaller than the entire result set without N limit).

Referring again to FIG. 10, a query 1000 illustrates an embodiment using a partial sort as described above. The query selects from TableT as shown in FIG. 6. In this case, there is no f1, f2 index for the "order by f1, f2" clause. However, according to this embodiment, there is an index shown in FIG. 7 which matches the left most order by key, in this case f1, where Index 1 is over f1, f3. This index can be used to obtain the first n data records (3 in the example shown) of the TableT that satisfy the Where clause, plus any other data records until the next unique value in the index used is encountered. In query 1000 shown in FIG. 10 and using TableT in FIG. 6, the access plan of the query would be modified to retrieve the first 3 data records using index1. The first 3 results form index1 is RRN 8, 4 and 9 as follows:

| RRN | f1 | f2 | f3 |
|-----|----|----|----|
| 8   | 0  | d  | 1  |
| 4   | 0  | a  | 3  |
| 9   | 1  | d  | 1  |

Next, the access plan would indicate to continue retrieving data records until the next value of the index is encountered. In this case the third record was at the value of "1" for the f1 index. So records need to be retrieved until "2" is encountered in the f1 index, so the results from the index1 is RRN 5, 2, 3, and 7 as follows:

| RRN | f1 | f2 | f3 |
|-----|----|----|----|
| 5   | 1  | a  | 2  |
| 2   | 1  | b  | 5  |
| 3   | 1  | c  | 5  |
| 7   | 2  | d  | 2  |

These records are then merged with the prior 3 data records, sorted and the top 3 values returned as follows:

| f1 | f2 | f3 |
|----|----|----|
| 0  | a  | 3  |
| 0  | d  | 1  |
| 1  | a  | 2  |

A similar variation of this technique is if there is no index over the left most field (or if it is faster) would have the optimizer pre-sort the left most key(s) of the ORDER BY, and then fetch the N (plus additional values needed for first N rows as described above), and then do a sort of the fetched rows. _This will still fetch and sort far fewer rows then fetching and sorting the entire result set. _For example, if the left most column is from a reasonably small table which is joined to other tables, this technique would be very efficient.

The partial sort described above was presented for the case of Fetch First N Rows. However, this embodiment applies equally well to an interactive query with an ORDER BY, but without a Fetch First N Rows. In an interactive query the database only fetches enough rows to fill a user's screen. Thus, the entire result set does not need to be fetched for the user unless they page down through the results and need the query to fetch more records. An interactive query is a Fetch First N Rows query where the Fetch First N Rows clause is implied and set by the number of rows that will fit on the screen. For the purposes of the specification and claims herein, a query with a Fetch First N Rows only clause includes an interactive query where the number of rows is implied. In an interactive query, a page down does not typically involve re-fetching the first rows, but in other ways is essentially the same as described for the Fetch First N Rows queries described above.

The embodiments described above were for a query that contained a Fetch First n Row clause and an Order By clause. The methods described above work similarly for a Group By clause instead of an Order By clause according to other embodiments claimed herein.

Referring to FIG. 11, a query 1100 illustrates an embodiment using a Group By. The query selects from TableT as shown in FIG. 6. In this case, there is a "Group By" clause 1110 that indicates to group by column f3. In query 1100 shown in FIG. 11 and using TableT in FIG. 6, an access plan of the query would be generated to retrieve the first 2 data records using index f1 and then continuing to retrieve records until the start of a unique group. This would cause the first 3 records would be retrieved as follows:

| RRN | f1 | f2 | f3 |                                                              |
|-----|----|----|----|--------------------------------------------------------------|
| 9   | 1  | d  | 1  |                                                              |
| 5   | 1  | a  | 2  |                                                              |
| 2   | 1  | b  | 5  | (start of a unique group so fetching stops here and discard this row) |

Next, the access plan would indicate to retrieve the first 2 data groups using index f1 and then continuing to retrieve records until the start of a unique group. This would cause the first 3 records would be retrieved as follows:

| RRN | f1 | f2 | f3 |                                                              |
|-----|----|----|----|--------------------------------------------------------------|
| 8   | 0  | d  | 1  |                                                              |
| 9   | 1  | d  | 1  |                                                              |
| 7   | 2  | d  | 2  |                                                              |
| <end of index> | | | | (implies start of next unique group so fetching stops here) |

These records are then merged with the prior 2 data records, and DISTINCT applied to the RRN as follows:

| RRN | f1 | f2 | f3 |
|-----|----|----|----|
| 8   | 0  | d  | 1  |
| 9   | 1  | d  | 1  |
| 7   | 2  | d  | 2  |
| 5   | 1  | a  | 2  |

Next, the access plan would indicate to group on f3 and then perform aggregate functions (i.e. in this case count) as follows:

| f3 | count(*) |
|----|----------|
| 1  | 2        |
| 2  | 2        |

Next the access plan would indicate to return the first n (2) groups as follows:

| f3 | count(*) |
|---|---|
| 1 | 2 |
| 2 | 2 |

The example shown only has 2 groups prior to the last step so the results are the same. In this example the grouping was executed on the 4 records listed above.

In contract to the previous example, the prior art method required additional records to be grouped. The following example illustrates how the query shown in FIG. 11 would be analyzed and an access plan generated according to the prior. First an access plan of the query would be generated to retrieve the data records matching the where clause as follows:

| RRN | f1 | f2 | f3 |
|---|---|---|---|
| 8 | 0 | d | 1 |
| 9 | 1 | d | 1 |
| 5 | 1 | a | 2 |
| 7 | 2 | d | 2 |
| 10 | 1 | d | 3 |
| 2 | 1 | b | 5 |
| 3 | 1 | c | 5 |

Next, the access plan would indicate to group on f3 and then perform aggregate functions (i.e. in this case count) as follows:

| f3 | count(*) |
|---|---|
| 1 | 2 |
| 2 | 2 |
| 3 | 1 |
| 5 | 2 |

Next the access plan would indicate to return the first n (2) groups as follows:

| f3 | count(*) |
|---|---|
| 1 | 2 |
| 2 | 2 |

In this prior art example, the Group By was performed on seven records as shown above. In contrast, in the example illustrated above according to the preferred embodiments, the Group By was performed on only four records. In the preferred embodiment example, the other records were eliminated prior to the grouping operation to enhance the database performance as described and claimed herein.

Figure 12:
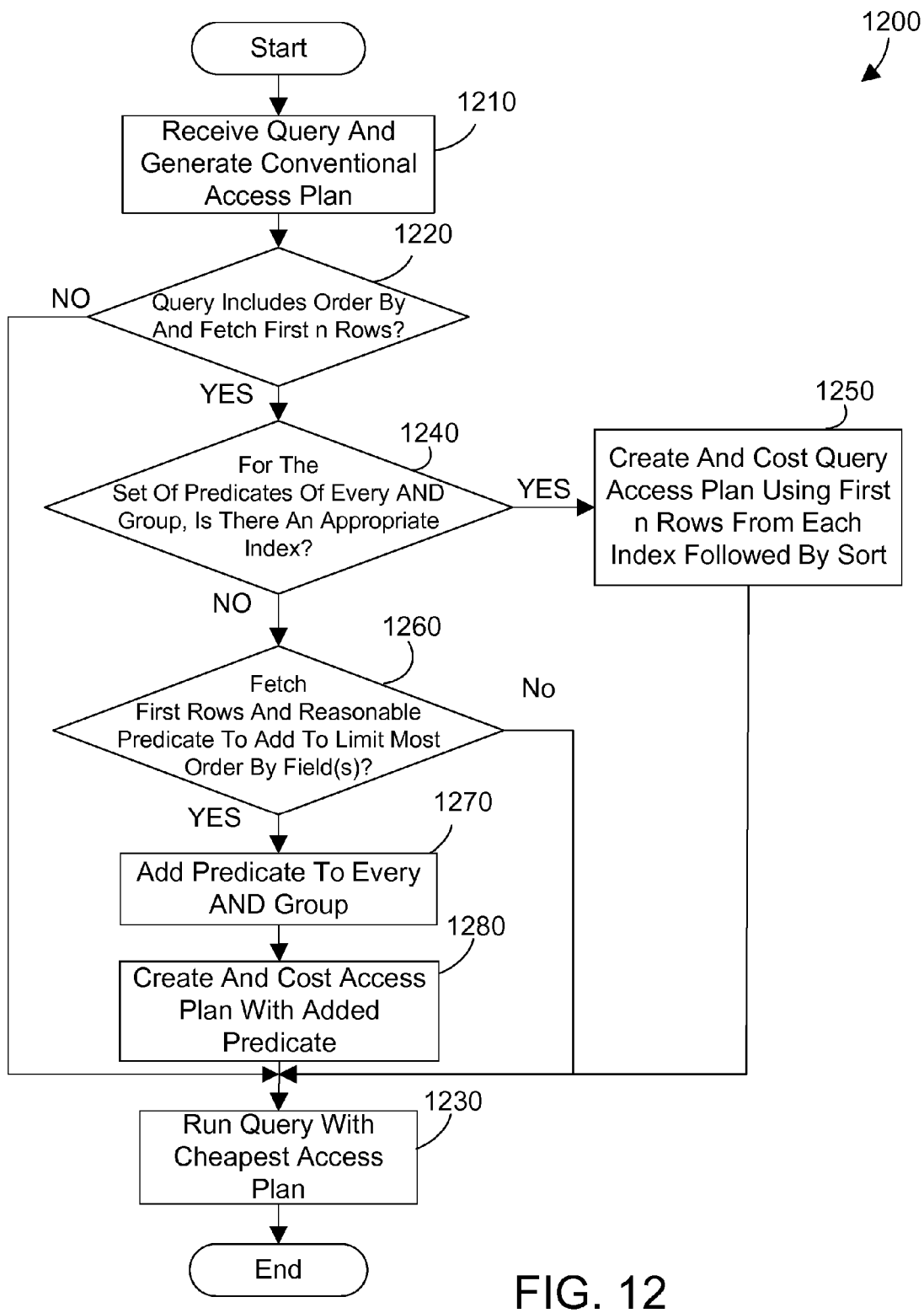
FIG. 12 is a flow diagram illustrating a method according to preferred embodiments.

Referring now to FIG. 12, method 1200 is illustrated for evaluating a query that includes a Select query statement with a Fetch First n Rows Only clause 126 (FIG. 1) in accordance with the preferred embodiments. Method 1200 begins by receiving the next query or set of queries and generating a conventional access plan (step 1210). The query is parsed to determine if the query contains an Order By clause and a Fetch First n Rows Only clause (step 1220). If an Order By clause and a Fetch First n Rows Only Clause are not found, then the method 1200 proceeds to run the query with the cheapest access plan (step 1230) and then the method is done. If a Fetch First n Rows Only clause is found (step 1220=yes), the set of predicates of the query is then checked to determine if there is an appropriate index in every AND group that is OR'd together (step 1240). If there is an appropriate index for each AND group (step 1240=yes) the method then creates and costs an access plan to retrieve the first n rows from each index followed by a sort of the records and then selecting the first n records (step 1250). The method 1200 then proceeds to run the query with the cheapest access plan (step 1230). If there is no appropriate index for each AND group (step 1240=no) then the query is checked to see if there is a reasonable predicate to add to limit the left most order by field(s) (step 1260). The reasonable predicate may be determined from the previous query history. If there is no predicate to add (step 1260=no) then run the query with the cheapest access plan (step 1230). If there is a predicate to add (step 1260=yes) then the appropriate predicate is added to every AND group (step 1070) and the method 1200 creates and costs an access plan with the added predicate (step 1280). The method then runs the query with the cheapest access plan (step 1230) and is then done.

Figure 13:
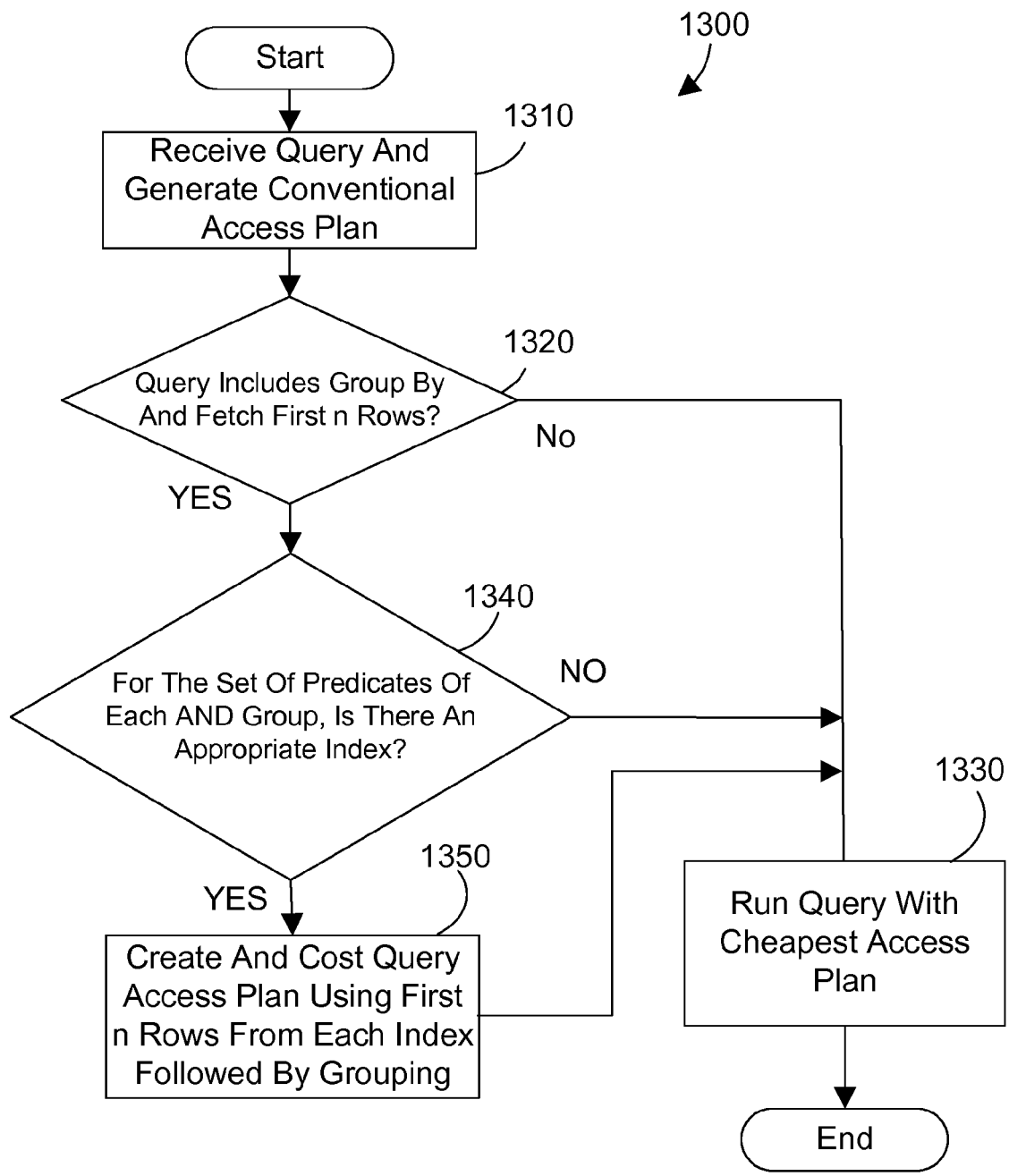
FIG. 13 is another flow diagram illustrating a method according to preferred embodiments.

Referring now to FIG. 13, method 1300 is illustrated for evaluating a query that includes a Select query statement with a Fetch First n Rows Only clause 126 (FIG. 1) in accordance with another preferred embodiments. In this method the query is parsed for a "Group By" clause instead of an "Order By" clause. Method 1300 begins by receiving the next query or set of queries and generating a conventional access plan (step 1310). The query is parsed to determine if the query contains a Group By and a Fetch First n Rows Only clause (step 1320). If a Group By clause and a Fetch First n Rows Only Clause are not found, then the method 1300 proceeds to run the query with the cheapest access plan (step 1330) and then the method is done. If a Group By clause and a Fetch First n Rows Only clause is found (step 1320=yes), the set of predicates of the query is then checked to determine if there is an appropriate index in each AND group that is OR'd together (step 1340). If there is an appropriate index for each AND group (step 1340=yes) the method then creates and costs an access plan to retrieve the first n groups from each index followed by grouping of the records and then selecting the first n records (step 1350). The method 1300 then proceeds to run the query with the cheapest access plan (step 1330). If there is no appropriate index for each AND group (step 1340=no) then the method then runs the query with the cheapest access plan (step 1330) and is then done.

Figure 14:
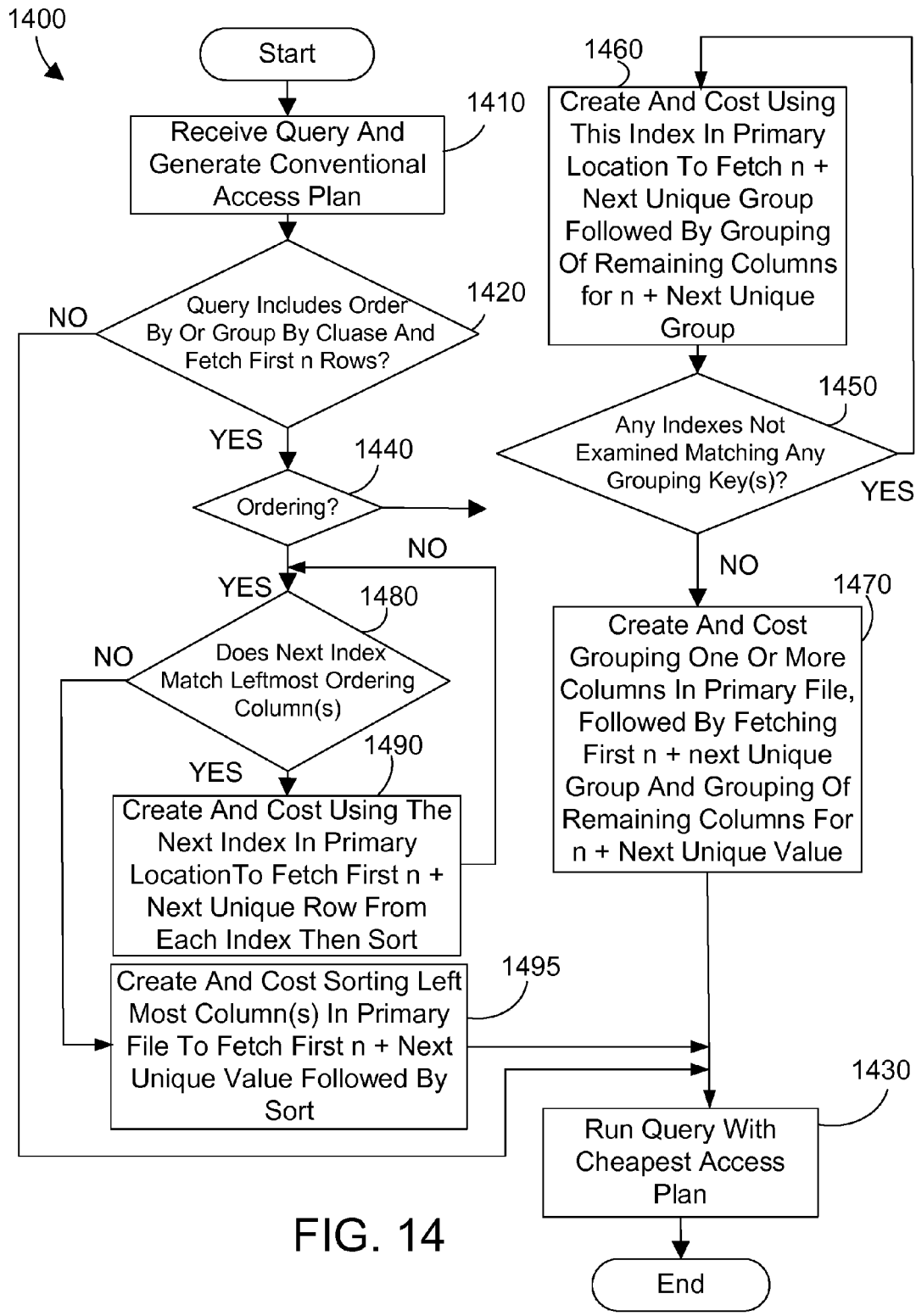
FIG. 14 is another flow diagram illustrating a method according to preferred embodiments.

Referring now to FIG. 14, method 1400 is illustrated for evaluating a query that includes a Select query statement with a Fetch First n Rows Only clause 126 (FIG. 1) in accordance with the preferred embodiments. Method 1400 begins by receiving the next query or set of queries and generating a conventional access plan (step 1410). The query is parsed to determine if the query contains an Order By clause or a Group By clause and a Fetch First n Rows Only clause (step 1420). If an Order By clause or a Group By clause and a Fetch First n Rows Only Clause are not found, then the method 1400 proceeds to run the query with the cheapest access plan (step 1430) and then the method is done. If a Order By clause or a Group By clause and a Fetch First n Rows Only Clause are found (step 1420=yes), the set of predicates of the query is then checked to determine if there is appropriate ordering to do a partial sort as described above (step 1440). If there is not appropriate ordering (step 1440=no) the method then determines whether there is any indexes not yet examined matching any grouping key(s) (step 1450). If there are more indexes matching grouping keys (step 1450=yes) then the method 1400 then proceeds to create and cost an access plan using this matching the index in the primary location to fetch n groups plus the next rows until the next unique group is encountered, followed by grouping of the remaining columns for n plus the next unique group (step 1460). The method then proceeds to step 1440 again. If there any indexes not examined matching grouping keys (step 1450=no) then the method 1400 proceeds to step 1470. Step 1470 creates and costs an access plan with one or more with grouping one or more columns in the primary file followed by fetching the first n plus the next unique groups and then grouping the remaining columns for n plus the next unique value (step 1470). The method then runs the query with the cheapest access plan (step 1430) and is then done. Returning to step 1440, if there is appropriate ordering to be done (step 1440=yes) the method then determines whether there is any more AND groups OR'd together (step 1480). If there are more AND groups OR'd together (step 1480=yes) then the method 1400 creates and costs an access plan using each index followed by a sort (step 1490). If there are no more AND groups OR'd together (step 1480=no) then the method 1400 creates and costs an access plan using the left most column in the primary file (step 1495). The method then runs the query with the cheapest access plan (step 1430) and is then done.

The present invention as described with reference to the preferred embodiments provides significant improvements over the prior art. An SQL Select statement with a Fetch First n Rows Only clause is analyzed to determine if the expression can be optimized, and if so, the Select statement is reformulated to improve system performance or the access plan is optimized as described above. The present invention provides a way to reduce database query time to improve system performance, and reduce excessive delays in database accesses.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor containing a database of records;
   a query residing in the memory that includes a Select statement with a Fetch First n Rows Only clause, where n is an integer variable;
   a query optimizer residing in the memory and executed by the at least one processor, wherein the query optimizer performs the steps comprising:
   determining that the query is optimizable;
   generating for the query an optimized access plan that eliminates records defined by a Where clause prior to ordering the records and then return a first n rows;
   determining that the query contains an Order By clause, wherein the Order By clause contains a reasonable predicate that is determined using a previous query history, wherein the reasonable predicate specifies a size that guarantees a sufficiently large enough subset of data is returned by a sort; and
   eliminating records prior to the sort by creating an access plan that fetches fewer rows by adding the reasonable predicate to every AND group of the Where clause.

2. The apparatus of claim 1 wherein the Fetch First n Rows Only clause is implied and the query is an interactive query.

3. An apparatus comprising:
   at least one processor;
   a memory coupled to the at least one processor containing a database of records;
   a query residing in the memory that includes a Select statement with a Fetch First n Rows Only clause, where n is an integer variable; and
   a query optimizer residing in the memory and executed by the at least one processor, wherein the query optimizer performs the steps comprising:
   determining the query is optimizable;
   generating for the query an optimized access plan that eliminates records defined by a Where clause prior to ordering the records and then returns a first n rows;
   determining the query contains a Group By clause, wherein the Group By clause contains a reasonable predicate that is determined using a previous query history, wherein the reasonable predicate specifies a size that guarantees a sufficiently large enough subset of data is returned by a sort; and
   eliminating records prior to the sort by creating an access plan that fetches fewer rows by adding the reasonable predicate to every AND group of the Where clause.

4. The apparatus of claim 3 wherein the query optimizer further determines that an index exists for each predicate in the Where clause and that the field of the Group By clause exists in each index; and
   wherein the access plan that eliminates records prior to grouping by fetching only n rows from each index and then returning the n rows after grouping the n rows from each index.

5. A computer-implemented method for optimizing a database query that includes a Select statement with a Fetch First n Rows Only clause, the method comprises the steps of:
   analyzing the query to determine that the query is optimizable;
   generating for the query an optimized access plan that eliminates records defined by a Where clause prior to ordering the records and then returns a first n rows, where n is an integer variable;
   retrieving data from a computer database using the optimized access plan;
   determining the query contains an Order By clause, wherein the Order By clause contains a reasonable predicate that is determined using a previous query history, wherein the reasonable predicate specifies a size that guarantees a sufficiently large enough subset of data is returned by a sort; and
   eliminating records prior to the sort by creating an access plan that fetches fewer rows by adding the reasonable predicate to every AND group of the Where clause.

6. The method of claim 5 wherein the Fetch First n Rows Only clause is implied and the query is an interactive query.

7. The method of claim 5 further comprising the steps of:
   determining that an index exists for each predicate in the Where clause and the field of the Order By clause exists in each index; and returning n rows after sorting a set of records that includes the n rows from each index, wherein the access plan eliminates records prior to the sort by fetching only n rows from each index.

8. A program product comprising:

(A) a query optimizer that executes the following steps:

analyzing a query that includes a Select statement with a Fetch First n Rows Only Clause;

determining that the query is optimizable;

generating for the query an optimized access plan that eliminates records defined by a Where clause prior to ordering the records and then returns a first n rows, where n is an integer variable;

determining that the query contains an Order By clause, wherein the Order By clause provides a reasonable predicate that is determined using a previous query history, wherein the reasonable predicate specifies a size that guarantees a sufficiently large enough subset of data is returned by a sort; and eliminating records prior to the sort by generating an access plan that fetches fewer rows by adding the reasonable predicate to every AND group of the Where clause; and (B) computer-recordable storage media bearing the query optimizer.

9. The program product of claim 8 wherein the Fetch First n Rows Only clause is implied and the query is an interactive query.

10. The program product of claim 8 wherein the query optimizer further determines that an index exists for each predicate in the Where clause and that the field of the Order By clause exists in each index; and wherein the access plan eliminates records prior to a sort by fetching only n rows from each index and then returns n rows after sorting a set of records that includes the n rows from each index.

11. The program product of claim 8 wherein the query optimizer further determines that the query contains a Group By clause, that an index exists for each predicate in the Where clause, and that the field of the Group By clause exists in each index; and wherein the access plan eliminates records prior to grouping by fetching only n rows from each index and then returning n rows after grouping the n rows from each index.

12. The program product of claim 8 wherein the query optimizer further determines that the query contains a Group By clause and that there is a determinable value of a field of the Group by Clause; and wherein the access plan eliminates records prior to grouping by adding the field with the determinable value to each predicate of the Where clause.

13. The program product of claim 8 wherein the query optimizer further determines that the query contains a Group By clause and that an index exists for the leftmost column but not all the columns; and wherein the access plan eliminates records prior to grouping by fetching n rows from the index over the leftmost column and additional rows until a unique value of the index is encountered.

* * * * *